United States Patent [19]

Girard

[11] Patent Number: 4,798,148

[45] Date of Patent: Jan. 17, 1989

[54] DEVICE FOR INTERCOMMUNICATION BETWEEN COUPLED VEHICLES IN WHICH PASSENGERS CAN WALK FREELY, ESPECIALLY RAILWAY CARS OR ROAD VEHICLES

[75] Inventor: Jean-Michel Girard, Paris Défense, France

[73] Assignee: A.N.F. Industrie, Crespin-Blanc-Misseron (Nord), France

[21] Appl. No.: 127,087

[22] Filed: Dec. 1, 1987

[51] Int. Cl.[4] .......................... B61D 17/22; B60D 5/00
[52] U.S. Cl. ........................................ 105/17; 105/18; 208/403
[58] Field of Search ................... 105/3, 18, 16, 15, 20, 105/8.1, 458, 425, 17; 280/403, 424; 296/166; 160/19, 84 R; 14/71.5; 285/226, 229; 138/120; 191/23 R; 213/50

[56] References Cited

U.S. PATENT DOCUMENTS

| | | | |
|---|---|---|---|
| 1,891,964 | 12/1932 | Whitmore | 105/15 |
| 2,081,964 | 6/1937 | Tomlinson | 105/16 |
| 2,287,025 | 6/1942 | Christianson | 105/15 |
| 2,354,045 | 7/1944 | Nystrom et al. | 105/15 |
| 2,385,138 | 9/1945 | Keller | 105/15 |
| 2,563,411 | 8/1951 | Miller | 105/18 |
| 2,568,684 | 9/1951 | Mihalyi | 105/18 |
| 2,643,617 | 6/1953 | Nystrom et al. | 105/15 |
| 2,843,417 | 7/1958 | Wahl et al. | 105/18 |
| 3,633,945 | 1/1972 | Press et al. | 285/226 |
| 4,159,133 | 6/1979 | Belanger | 285/226 |
| 4,318,345 | 3/1982 | Kleim | 105/18 |
| 4,736,688 | 4/1988 | Ando et al. | 105/18 |

FOREIGN PATENT DOCUMENTS

| | | |
|---|---|---|
| 1128454 | 4/1962 | Fed. Rep. of Germany . |
| 2817739 | 10/1979 | Fed. Rep. of Germany ...... 280/403 |
| 3401298 | 7/1985 | Fed. Rep. of Germany . |

Primary Examiner—Johnny D. Cherry
Assistant Examiner—Joseph D. Pape
Attorney, Agent, or Firm—Stevens, Davis, Miller & Mosher

[57] ABSTRACT

An intercommunication device mounted between the two oppositely-facing open ends of two coupled railway cars is constituted by a series of rings of generally rectangular shape consisting alternately of rigid rings and flexible rings suitably attached to each other so as to constitute a flexible intercommunication tunnel, the open ends of which are attached respectively to the open ends of the railway cars. The tunnel permits free and unrestricted movement of passengers from one car or vehicle to another in all types of coupled wheeled units such as railway trains, articulated road vehicles, airport passenger bridges and the like.

12 Claims, 8 Drawing Sheets

FIG_1

FIG_2

DEVICE FOR INTERCOMMUNICATION BETWEEN COUPLED VEHICLES IN WHICH PASSENGERS CAN WALK FREELY, ESPECIALLY RAILWAY CARS OR ROAD VEHICLES

BACKGROUND OF THE INVENTION

1. Field of the Invention

This invention relates to devices for intercommunication between coupled vehicles in which passengers are able to walk freely, in particular railway cars, road vehicles such as, for example, articulated buses or trolley buses or even specialized vehicles such as passenger bridges of the type used in large airports.

For the sake of enhanced simplicity, reference will be made almost exclusively in the following description to railway passenger cars. However, it would clearly not constitute any departure from the scope of this invention if the term "railway car" as used hereinafter were to be replaced by the term "vehicle" as interpreted in the sense defined earlier.

2. Description of the Prior Art

As a general rule, an intercommunication device of a known type used in railway rolling stock and referred to as a "concertina vestibule" consists of a bridge-type unit having a structural framework equipped with a bellows or equivalent flexible structure, this unit being often completed by side shields. These devices are relatively complicated, not impervious to outside air and are frequently unattractive in general appearance.

SUMMARY OF THE INVENTION

The aim of the invention is to provide an intercommunication device which is not subject to the disadvantages of conventional devices.

To this end, the device in accordance with the invention is constituted by a series of rings of generally rectangular shape which consist alternately of rigid rings and flexible rings suitably attached to each other so as to form a flexible intercommunication tunnel, the two ends of which are adapted to be attached respectively to the two oppositely-facing open ends of two coupled railway cars.

A device of this type is adaptable to all types of railway cars and is capable of accommodating all kinds of displacements such as angular or lateral displacements, movements of transverse inclination or elevation. This system does not call for the presence of a bridge since the device itself constitutes the bearing member. In addition, the device has no complicated parts, does not require any side shields for masking dangerous moving parts, and has walls of very small thickness. If care is taken to ensure that the rings are given dimensions which are close in value to those of the railway-car ends, the device accordingly ensures continuity of the free cross-sectional area provided for passage of travelers throughout the length of the train. The structural continuity thus achieved in fact results in a leak-tight assembly having rigid walls. Furthermore, if the space located between two rigid rings and containing a flexible ring is covered with plates which are integral with the rigid rings in accordance with another distinctive feature of the invention, the assembly is provided with practically continuous functional walls having an attractive appearance and is also protected against vandalism.

DESCRIPTION OF THE PREFERRED EMBODIMENTS

Figure 1:
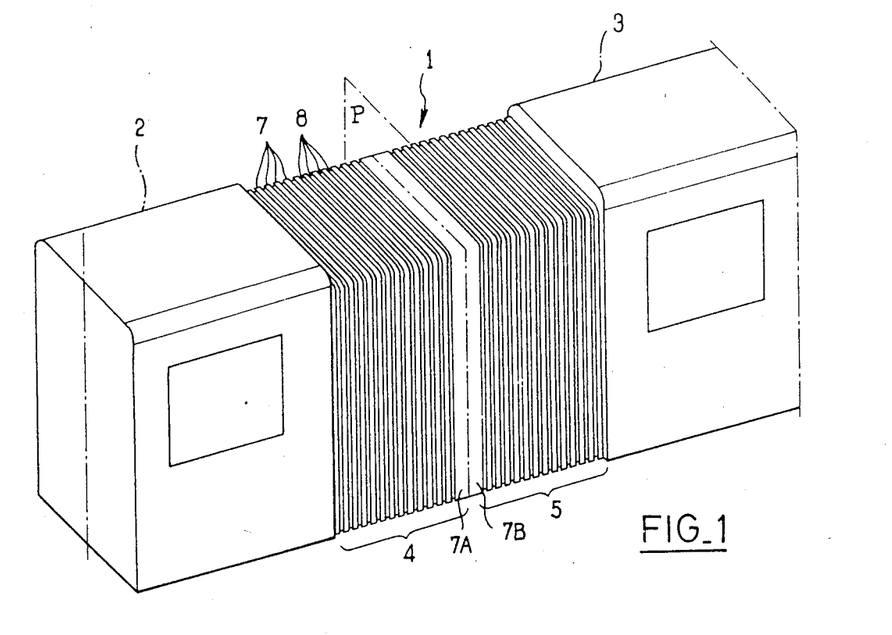
FIG. 1 is a perspective view of a set of devices for intercommunication between two railway cars in accordance with the invention.

The intercommunication device as generally designated in FIG. 1 by the reference numeral 1 is interposed between the two oppositely-facing open ends 2, 3 of two coupled railway cars, thus constituting a so-called "intercommunication tunnel" having a rectangular cross-section. In the embodiment shown the intercommunication tunnel consists of two valves designated as half-sections 4, 5. These half-sections are attached at one end respectively to the two railway-car ends 2, 3 and at the other end to each other along a transverse vertical median joint plane indicated at P.

Figure 2:
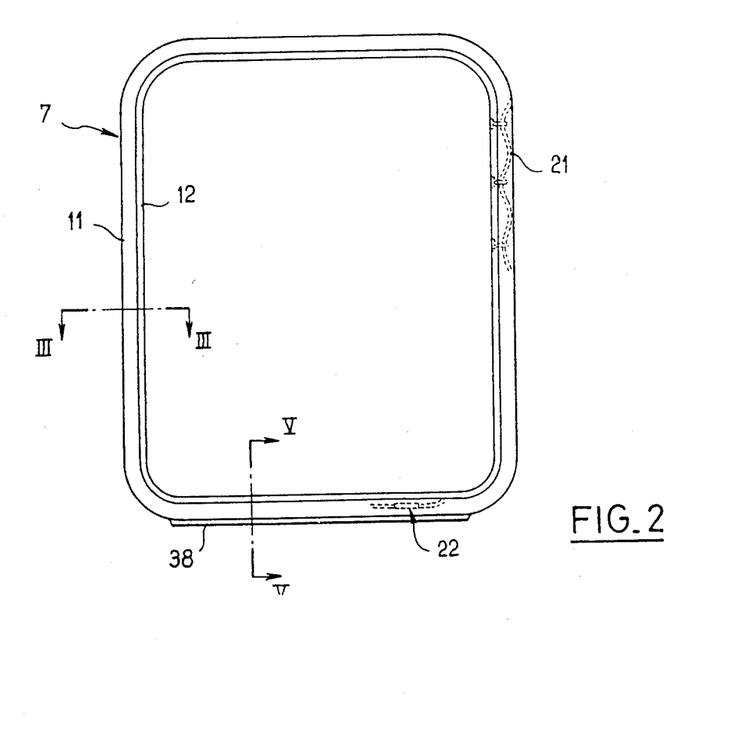
FIG. 2 is a cross-sectional view of the device of FIG. 1.
Figure 3:
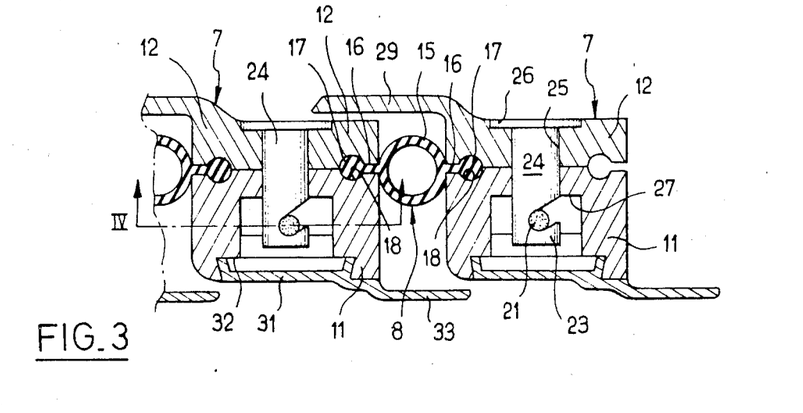
FIG. 3 is a horizontal part-sectional view to a larger scale, this view being taken along line III—III of FIG. 2.

Each tunnel half-section is constituted by a series of rings of generally rectangular shape and consisting in alternate sequence of rigid rings 7 (as also shown in FIGS. 2 and 3) and of flexible rings 8 suitably attached to each other by any suitable means such as, for example, screwing, attachment by snap-action engagement, by fastening clips or by adhesive bonding. The rigid rings are formed, for example, of metal and preferably a light metal such as aluminum.

For reasons of convenience of manufacture and assembly, it is preferable to design the rigid rings in two parts. In the embodiment illustrated in FIG. 3, the two parts, or ring segments 11, 12, are so designed as to be mounted one inside the other and have the same thickness in the axial direction. These ring segments are extruded structural shapes which are bent in compliance with the tunnel profile.

In this example, the flexible ring 8 is of elastomer having suitable characteristics with an intermediate or central main member 15 where is tubular in the example considered and is provided on each side, in the axial direction, with a membrane 6 terminating in a bulge 17 in the form of a cylindrical strip. The cylindrical-strip member of each flexible ring is imprisoned in an annular channel 18 having edges located in proximity to each other and having a configuration which corresponds to that of the assembly formed by the cylindrical-strip member 17 and the membrane 16. Said channel 17 is formed in the corresponding front faces of the two adjacent rigid rings. More explicitly, in the case of the example under consideration, the two half-channels are formed respectively in the inner half-ring 11 and in the outer half-ring 12 as tide the joint surface of these two ring segments.

Figure 4:
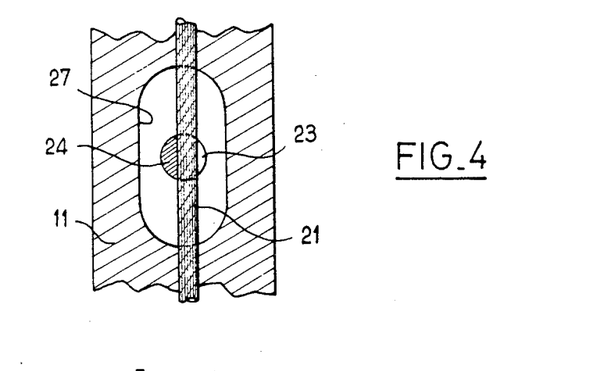
FIG. 4 is a fragmentary part-sectional view taken along line IV—IV of FIG. 3.

In order to maintain the to portions or segments of a rigid ring assembled together, provision is made in the embodiment shown in FIGS. 3 and 4 for a special system which includes a cable 21 (see also FIG. 2) which is fitted with a tensioning device 22 and passed through hooks 23. The rods 24 of said hooks are inserted in a series of radial bores 25 which traverse both ring segments 11, 12. Each hook 23 has a flat head 26 which is applied against one of the ring segments, namely in this instance the segment 12 which will be the inner segment, for example. The cable is applied against the edges of recesses 27 which are formed in the other ring segment (considered in this instance the outer segment 11) around the bores 25 in that face of said other ring segment (outer segment) which is directed away from the first segment 12, the hook 23 being located within said recess. By stretching the cable 21 by means of the tensioning device 22 (shown is FIG. 2), the two ring segments are powerfully applied against each other, with the result that the flexible ring 15 is suitably maintained between two rigid rings.

The cable 21 and the hooks 23 are protected against the effects of bad weather and the introduction of foreign bodies by means of a closure-plate 31 attached by snap-action engagement within a channel 32 formed in the external face of the outer ring segment 11, thus at the same time improving the appearance of the structure as a whole. The above-mentioned closure-plate is provided with an extension 33 constituting an outer shield for covering the space which is located between two successive rigid rings and in which is housed a flexible ring 8, thus ensuring protection of said flexible ring, especially against any acts of vandalism. Similarly, each inner ring segment 12 also has an extension 29 which partially covers the following ring and therefore provides a corresponding inner shield for masking the space in which a flexible ring is located. This according to the face on which passengers are able to walk. It may be stated in general terms that both the inner wall and outer wall of the entire tunnel assembly have relatively smooth surfaces which virtually constitute extensions of the walls of the railway cars themselves.

Figure 6:
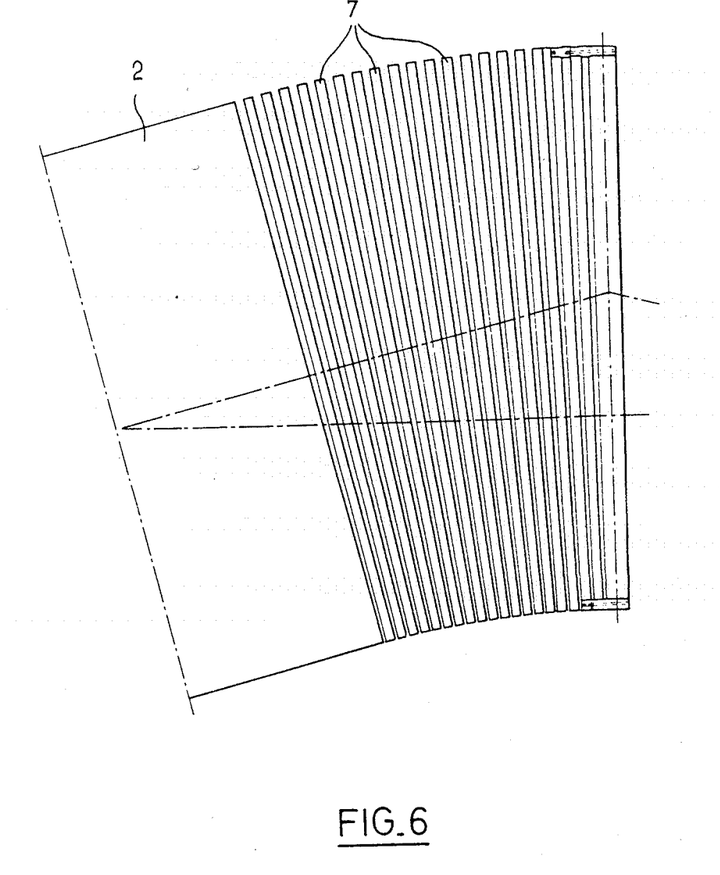
FIG. 6 is a plan view which serves to illustrate the behavior of the device in the case of a curved railroad track.

When the railway cars are resting on a straight track, the intercommunication tunnel as a whole has a relatively homogeneous configuration as shown in FIG. 1 and the flexible rings 8 retail their cylindrical tubular cross-section as can be seen in FIG. 3. On a curved railway track, those segments of rigid rings 7 which are located nearest the center of the railway-track curve (or in other words on the inner-radius side of the curve) move towards each other as can be seen in FIG. 6 whilst the corresponding portions of the flexible rings 8 are flattened as shown in FIG. 8, for example. It will be observed in this figure that the rigid rings have a slightly different structure and further reference will be made to this point when consideration is given hereinafter to the embodiment of FIG. 7. Conversely, the segments of the rigid rings 7 which are located on the outer-radius side of the track curve move away from each other whilst the corresponding portions of the flexible rings 8 are stretched as shown in FIG. 8A.

Figure 5:
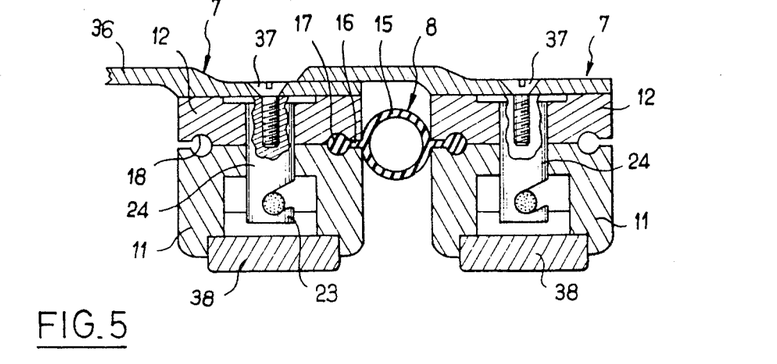
FIG. 5 is a fragmentary part-sectional view taken along line V—V of FIG. 2, and to the same scale.
Figure 10:
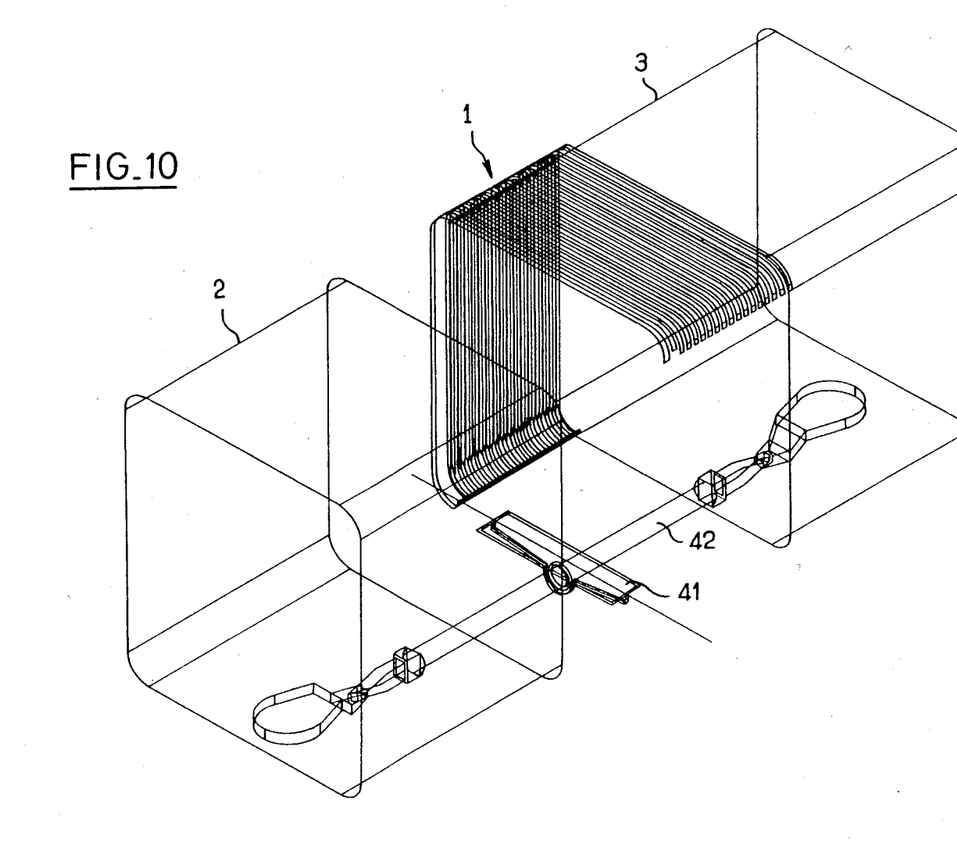
FIG. 10 is a perspective view which shows how the device can be partly supported by the drawbar between the two railway cars.
Figure 11:
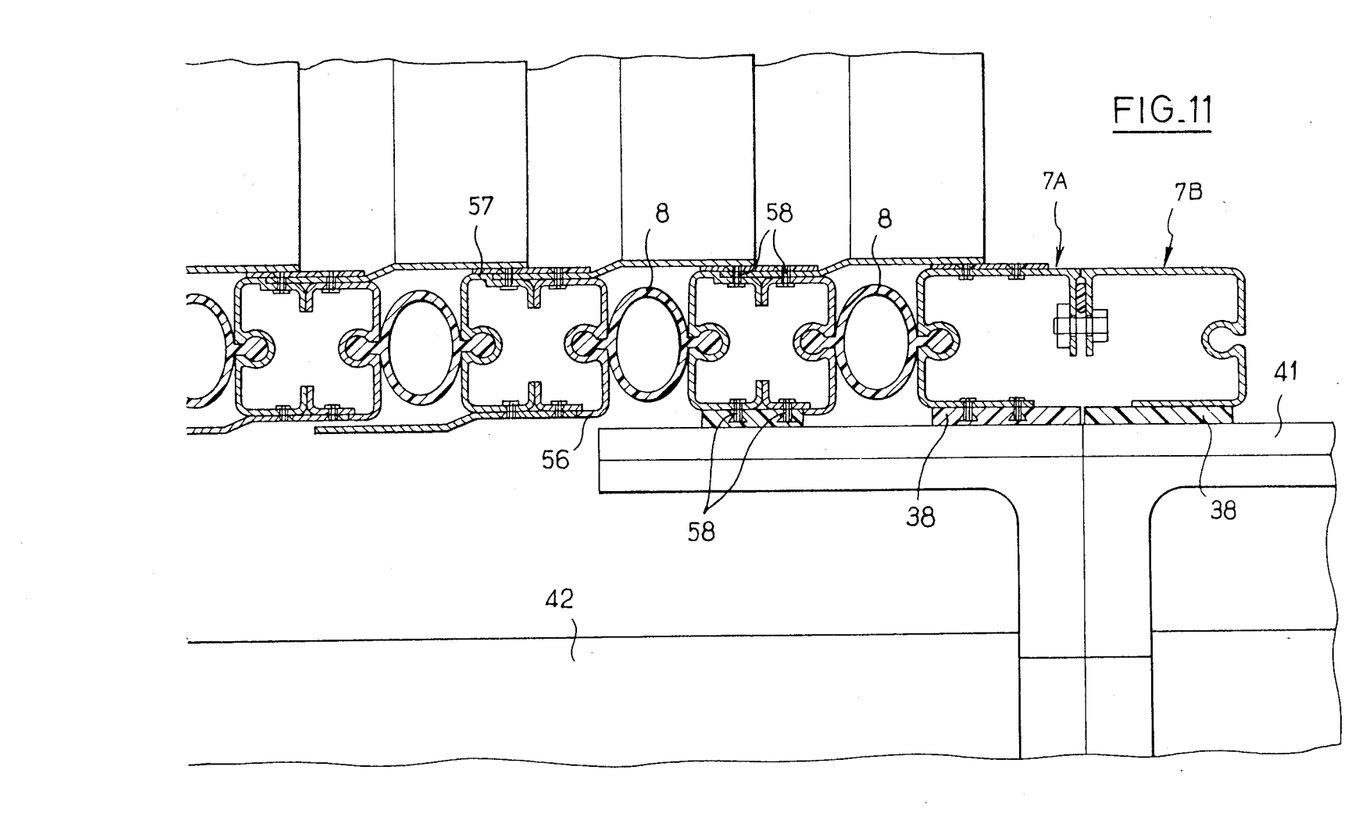
FIG. 11 is a vertical cross-sectional view to a larger scale showing the detail of the assembly of FIG. 10.

There is illustrated in FIG. 5 an alternative form of construction which differs from the embodiment of FIG. 3 solely in the fact that the shields are no longer integral with the rings but consist of strips 36 attached to the rings by means of screws 37 mounted within the rods 24 of the hooks used for retaining the assembly cables 21. Moreover, shoes 38 of material which affords high abrasion resistance have been fixed in position against the bottom face of the rigid rings. Said shoes 38 are adapted to rest of slide-bearing plates carried by the ends of the railway cars or alternatively, as illustrated in FIGS. 10 and 11, on a slide-bearing plate 41 carried by the drawbar 42 between the two railway cars.

Figures 7, 8A:
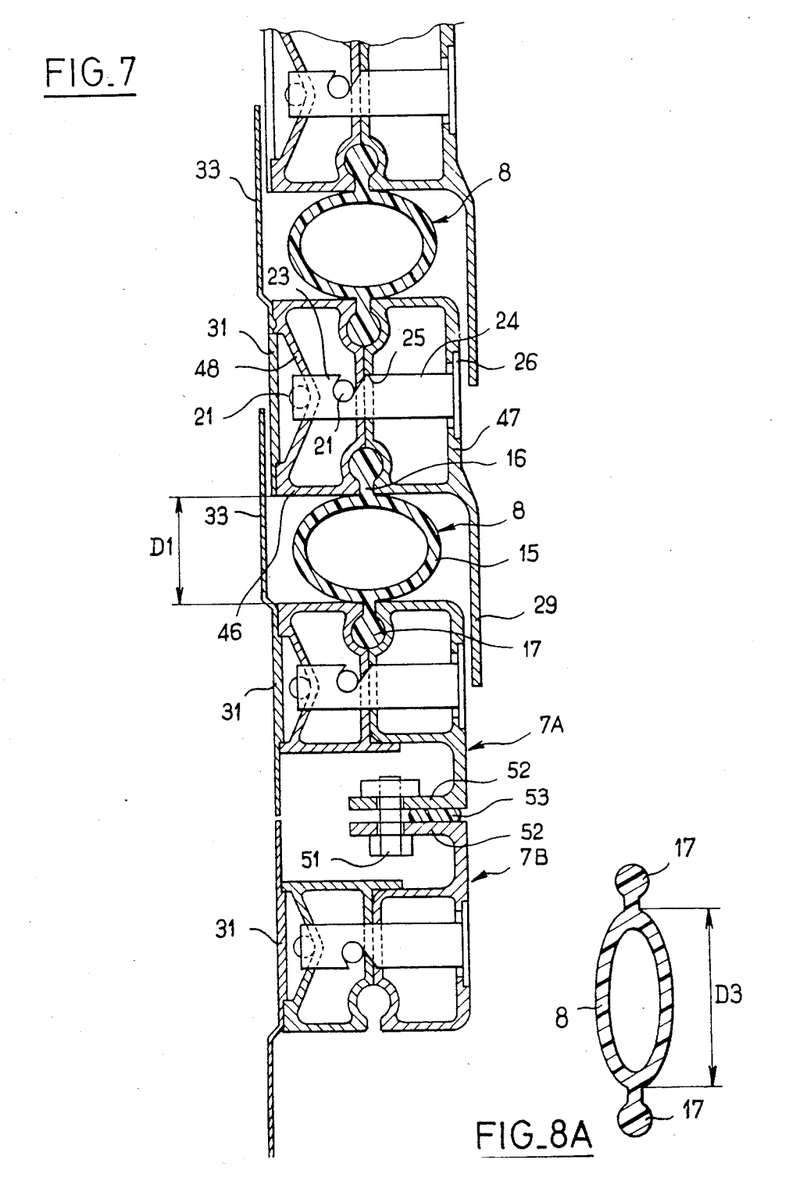
FIG. 7 is a view which is similar to that of FIG. 3 in the case of an alternative embodiment shown under conditions of running of railway cars on a straight track.
FIG. 8A illustrates under the same conditions the behavior of a flexible ring on the outer-radius side of the track.
Figure 8:
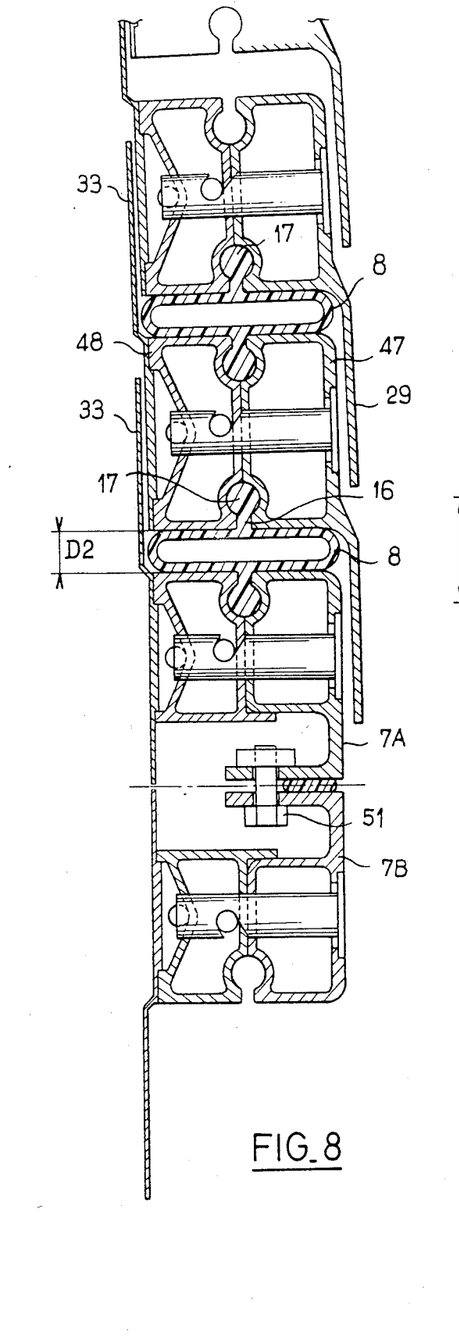
FIG. 8 illustrates the behavior of the device of FIG. 7 on the inner-radius side of a railroad-track curve when the cars are running on a curved track.

In FIG. 7, there is shown a variant of the embodiment of FIG. 3, in which the to ring segments 46, 47 are again mounted one inside the other and formed by extruded structural members. The inner wall 48 of the outer segment 46 has the shape of a V-section trough, the point of the "V" being located within the interior of the structural member. The tensioning cable 21 is applied against the bottom portion of said trough. The cable traction hooks 23, the rods of which are again guided within radial bores 25 of the inner ring segment 47, are located within gaps of substantial width formed in the trough 48 opposite to the radial bores 25. The mode of assembly for joining the ring segments to each other and to the flexible rings 8 is the same as in FIG. 3. By way of alternative, the main central member 15 of each flexible ring 8 has been given a cross-section in the shape of an ellipse instead of a circular shape. The shield plates for covering the flexible rings are again designated by the reference numerals 29 and 33. Interassembly of the two rigid rings 7A and 7B (as also shown in FIG. 1) which are located at the mid-length of the intercommunication tunnel is carried out by means of bolts 51 passed through coupling flanges 52 which have been bent-back towards the interior or the corresponding rings. A seal 53 is interposed between these two coupling flanges. The bolts 51 are accessible either prior to positioning or after removal of the closure-plates 31.

FIG. 8 illustrates, by comparison with FIG. 7, the behavior of the flexible rings 8 during bending movements of the intercommunication tunnel when relative displacements take place between the two railway-car ends at the time of movements of angular displacement or of transverse inclination. The flexible rings are either flattened or stretched to a greater or lesser degree as a function of the value of displacements of the rigid rings. In different states, the relative spacing of corresponding portions of the rigid rings ranges from the value D1 (FIG. 7) to the value D2 (FIG. 8) or else to the value D3 (FIG. 8A).

The choice of dimensions and numbers of rigid and flexible rings depends on the length of the intercommunication tunnel or in other words on the distance between the two railway cars. The choice of the degree of hardness of the flexible rings de-ends, not only on these parameters, but also on the ultimate values of forces to which the ends of the railway cars can be subjected.

By way of example, attachment of each rigid end-ring of the intercommunication tunnel to the open end of the corresponding railway car can be carried out in the same manner as in the arrangement adopted as shown in FIG. 7 for the purpose of assembling the two central rings together, that is, by means of bolts such as the bolt 51.

Figure 9:
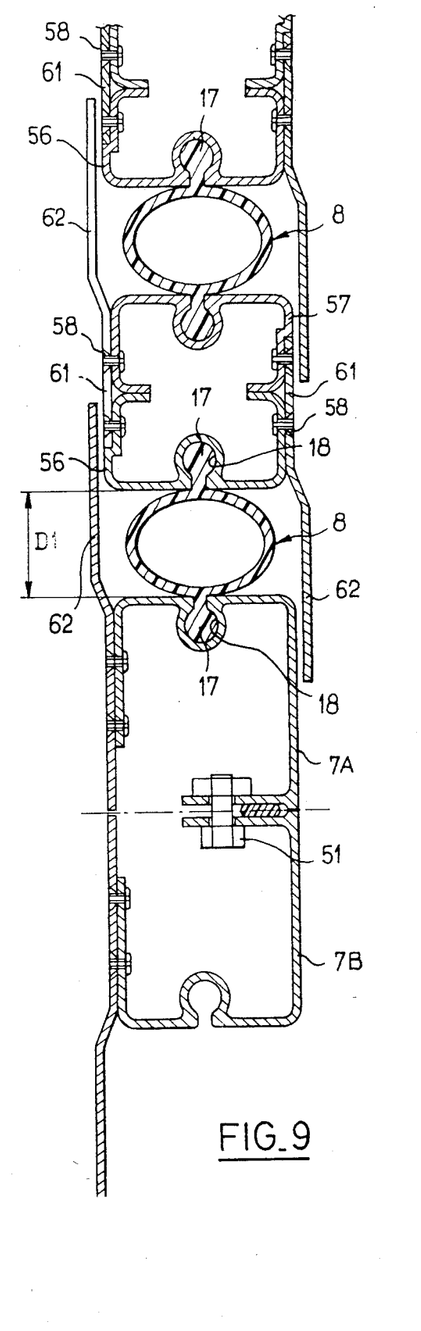
FIG. 9 is a view which is similar to that of FIG. 7 but with a different structure of rigid rings.

FIG. 9 shows another embodiment in which the two segments of each rigid ring are no longer mounted one inside the other but are applied one against the other along a transverse vertical plane. In the example illustrated, these two ring segments 56, 57 are identical and are also formed by extruded structural members which are subsequently bent in compliance with the intercommunication tunnel profile. The structural members have a U-shaped cross-section and are mounted against each other by juxtaposing the ends of their wings, these wings being bent-back in the inward direction so as to form flanges which are applied flatwise against each other. In this instance, the two ring segments 56, 57 are assembled together by means of rivets 58 passed through plates 61 which are applied astride the joints between the two ring segments and provided with extensions 62. As in the embodiment described earlier, these extensions cover the spaces in which the flexible rings 8 are housed. The cylindrical-strip members 17 of the flexible rings are retained within the two adjacent rigid rings by clamping the two lips of the channel 18 or in other words by drawing them together. The initial profile of said lips is open at the time of fabrication by extrusion and then closed at the moment of assembly of the flexible rings in order to look the cylindrical-strip members 17 in the bottom of the channels 18.

This embodiment facilitates maintenance of the intercommunication tunnel since it permits easy replacement of a flexible ring by systematic replacement of the two adjacent rigid-ring segments which support said flexible ring.

Figure 12:
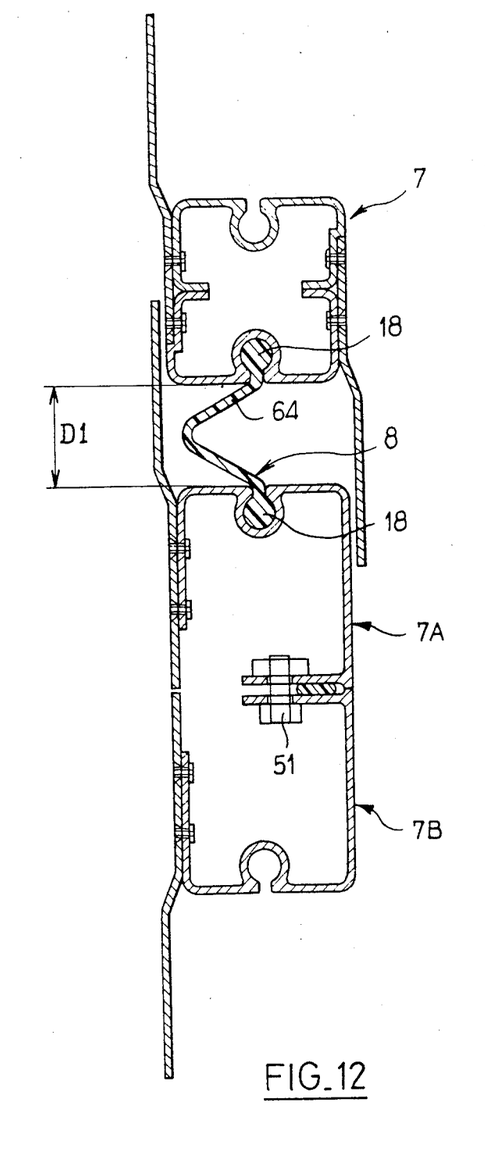
FIG. 12 is a view which is similar to that of FIG. 9 but with a flexible ring having a different profile.

In all the embodiments described earlier, each flexible ring has a main central member in the form of a pipe of circular or elliptical cross-section having two lateral membranes terminating in bulges constituting cylindrical-strip members for fixing the flexible ring in corresponding channels of the two adjacent rigid rings. However, the structure of the flexible rings could be different. Thus a V-section flexible ring 64 is illustrated in FIG. 12 from which it is apparent that, once it has been placed in position, each flexible ring has the configuration of two four-sided pyramid frustums juxtaposed on their large bases. The flexible ring could also have a W-shaped cross-section or could even have a wavy shape recalling that of a sine-wave, for example. Finally, the configuration of the flexible rings could be totally different from those contemplated in the foregoing and it would be possible to devise any other suitable means such as screwing, snap-action engagement, fastening with clips or even adhesive bonding, for example, for the purpose of securely attaching a flexible ring to the two adjacent rigid rings.

Figure 13:
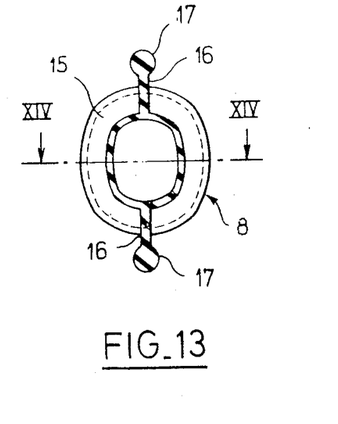
FIG. 13 shows another alternative flexible ring structure.
Figure 14:
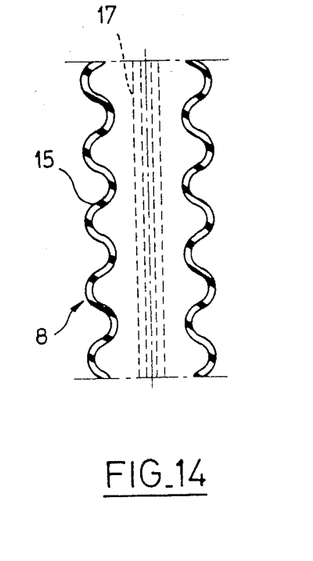
FIG. 14 is a sectional view taken along line XIV—XIV of FIG. 13.

Furthermore, it has been seen earlier how the flexible rings are capable of accommodating movements of angular displacement or transverse inclination. When these rings are required to accommodate differences in height between the two ends of railway cars, these differences are relatively small (of the order of 100 to 140 mm), with the result that such displacements can also be readily absorbed by the flexible rings without any attendant damage. However, when the cars negotiate a track curve which is immediately followed by a counter-curve, this may give rise to relative lateral displacements of the two car-ends by an amplitude of large value which is liable to attain 400 to 500 mm, for example. In such cases, although the vertical portions of the flexible rings are capable of withstanding the rolling motion to which they are subjected, this does not apply to the horizontal portions of said rings since the two cylindrical-strip members adopted in the embodiments described earlier would be subjected to an excessive relative lateral displacement. In order to overcome this drawback, a corrugated structure with transverse annular ridges can be given at least to the horizontal portions of the flexible rings as illustrated in FIGS. 13 and 14. In their words, the main central member 15 of each flexible ring in the free state is no longer designed in the form of a simple cylindrical pipe having a rectilinear generator-line but has a "corrugated" or wavy generator-line as shown in FIG. 14. The flexible ring is again provided on each side with the membrane 16 terminating in a bulge or cylindrical-strip member 17. The cylindrical-strip members accordingly permit the parallel and opposite displacements of substantial amplitude which are liable to occur in track curves and counter-curves. Such displacements thus become possible without thereby subjecting the elastomer material constituting the flexible rings to excessively high stresses by reason of the fact that this material is no longer subjected to stretching but only undergoes deformation of its general configuration which is specifically designed for this purpose.

As will be readily apparent, the invention is not limited in any sense to the examples which have been described in the foregoing with reference to the accompanying drawings. Depending on the applications which may be contemplated, any number of modifications within the capacity of those versed in the art may accordingly be made without thereby departing either from the scope or the spirit of the invention.

What is claimed is:

1. A device for intercommunication between two oppositely-facing open ends of two coupled vehicles in which passengers can walk freely, in particular railway cars, road vehicles such as articulated buses or trolley buses or else specialized vehicles such as passenger bridges of the type used in large airports, said device comprising a series of rings of generally rectangular shape which consist alternately of rigid rings and flexible rings suitably attached to each other so as to form a flexible intercommunication tunnel having a longitudinal axis, ends of the tunnel being adapted to be attached respectively to the aforementioned open ends of said vehicles and wherein each rigid ring is constituted by two rigid-ring segments assembled together, said rigid ring segments defining a pair of annular channels formed in an abutting surface thereof, wherein the flexible rings are of elastomer and each has a flexible intermediate portion provided along the longitudinal axis of the tunnel with each end thereof comprising a membrane terminating in a bulge in the form of a substantially cylindrical-strip member, said members being imprisoned in said annular channels.

2. A device according to claim 1, wherein the two ring segments which constitute a rigid ring are assembled one inside the other in terms of radial distance from the tunnel-axis, whereby each rigid ring is constituted by an inner rigid ring segment and an outer rigid ring segment, each end thereof comprising, 3. A device according to claim 2, wherein the annular channels for imprisoning the substantially cylindrical-strip members of the flexible rings consist of half-channels formed respectively in the inner rigid ring segment and in the outer rigid ring segment on each side of the abutting surface between said segments.

4. A device according to claim 3, wherein the intermediate portion of the flexible ring is tubular and does not completely fill the space formed between two successive rigid rings when the intercommunication tunnel as a whole has generally rectilinear configuration.

5. A device according to claim 2, wherein the two rigid-ring segments are assembled one inside the other by a cable fitted with a tensioning device and passed through hooks, rods of said hooks being inserted in a series of radial bores which traverse both ring segments, each hook aforesaid being provided with a flat head which is applied against a first ring segment whilst the cable is applied against edges of recess which are formed in the other ring segment around said bores on that face of said other ring segment which is directed away from the first ring segment aforesaid, the hook being located within said recess.

6. A device according to claim 5, wherein the aforesaid recesses having edges against which the assembly cable is applied are constituted by gaps formed in an inner wall of the outer ring segment, said wall being designed in the form of a trough having a V-shaped cross-section.

7. A device according to claim 5, wherein the aforesaid recesses are masked by a closure plate having an axial extension which serves as a cover-plate for the space located between two rigid rings.

8. A device according to claim 1, wherein the intermediate portion of the flexible rings is constituted by a series of at least two pyramid frustums joined by their bases.

9. A device according to claim 1, wherein space, located between two rigid rings containing a flexible ring, is covered to a substantial extent by a cover-plate which is rigidly fixed to one of the rigid rings and wherein the cover-plate is constituted by an added part attached to it.

10. A device according to claim 9, wherein the cover-plate also has a snap-action engagement means and extends to shield the space located between two successive rigid rings.

11. A device according to claim 1, wherein the bottom portion of the intercommunication tunnel is provided at its mid-length with a shoe of material which affords high abrasion resistance and is adapted to rest freely on a slide-bearing plate carried by the drawbar of two railway cars constituting the vehicles considered.

12. A device according to claim 1, wherein the bottom portion of the intercommunication tunnel is provided with shoes of material which affords high abrasion resistance, said shoes being adapted to rest freely on slide-bearing plates carried by the vehicles considered.

* * * * *